United States Patent
Brauer et al.

(10) Patent No.: US 6,676,369 B2
(45) Date of Patent: Jan. 13, 2004

(54) ASPIRATING FACE SEAL WITH AXIALLY EXTENDING SEAL TEETH

(75) Inventors: John C. Brauer, Lawrenceburg, IN (US); Christopher C. Glynn, Hamilton, OH (US); Robert J. Albers, Park Hills, KY (US)

(73) Assignee: General Electric Company, Schenectady, NY (US)

( * ) Notice: Subject to any disclaimer, the term of this patent is extended or adjusted under 35 U.S.C. 154(b) by 147 days.

(21) Appl. No.: 10/106,401

(22) Filed: Mar. 26, 2002

(65) Prior Publication Data

US 2003/0185669 A1 Oct. 2, 2003

(51) Int. Cl.$^7$ ................................................ F01D 11/02
(52) U.S. Cl. .................. 415/113; 415/173.7; 415/174.3
(58) Field of Search ........................... 415/173.7, 174.2, 415/174.3, 174.5, 111, 113

(56) References Cited

U.S. PATENT DOCUMENTS

| | | | | |
|---|---|---|---|---|
| 2,942,844 A | * | 6/1960 | Neate ...................... | 415/173.7 |
| 2,988,325 A | * | 6/1961 | Dawson ................... | 415/173.7 |
| 2,996,279 A | * | 8/1961 | Lorett et al. ............... | 415/115 |
| 3,606,349 A | | 9/1971 | Petrie et al. | |
| 3,791,758 A | * | 2/1974 | Jenkinson ................. | 415/116 |
| 4,211,424 A | | 7/1980 | Stein | |
| 4,375,891 A | * | 3/1983 | Pask ......................... | 415/115 |
| 4,477,088 A | | 10/1984 | Picard | |
| 4,830,575 A | * | 5/1989 | Bandukwalla ........... | 415/174.4 |
| 5,048,636 A | | 9/1991 | Roehrs | |
| 5,088,890 A | | 2/1992 | Jewess | |
| 5,174,584 A | | 12/1992 | Lahrman | |
| 5,224,822 A | * | 7/1993 | Lenahan et al. ............ | 415/189 |
| 5,284,347 A | | 2/1994 | Pope | |
| 5,311,734 A | | 5/1994 | Pope | |
| 5,575,486 A | | 11/1996 | Edling et al. | |
| 5,769,604 A | | 6/1998 | Gardner et al. | |
| 5,975,537 A | | 11/1999 | Turnquist et al. | |
| 6,050,079 A | | 4/2000 | Durgin et al. | |
| 6,134,877 A | | 10/2000 | Alkabie | |
| 6,254,071 B1 | | 7/2001 | Greenhill | |
| 6,322,079 B1 | | 11/2001 | Mullaney, III | |
| 6,325,380 B1 | | 12/2001 | Feigl et al. | |

FOREIGN PATENT DOCUMENTS

| | | |
|---|---|---|
| DE | 19611677 | 8/1996 |
| EP | 0745794 A1 | 4/1996 |

OTHER PUBLICATIONS

"Advanced Seals for Engine Secondary Flowpath", P000597192, Journal of Propulsion and Power, No. 4, Jul.–Aug. 1996, Mingfong Hwang and Adam N. Pope of Stein Seal Company, and Bernie Shucktis of General Electric Aircraft Engines, pp. 794–799.

(List continued on next page.)

Primary Examiner—Edward K. Look
Assistant Examiner—Igor Kershteyn
(74) Attorney, Agent, or Firm—William Scott Andes; Steven J. Rosen

(57) ABSTRACT

A gas turbine engine aspirating face seal includes a rotatable engine member and a non-rotatable engine member and a leakage path therebetween. Annular generally planar rotatable and non-rotatable gas bearing face surfaces circumscribed about a centerline are operably associated the rotatable and non-rotatable engine members respectively. Radially inner and outer tooth rings axially extend away from a first one of the rotatable and non-rotatable gas bearing face surfaces across the leakage path and towards a second one of the gas bearing face surfaces. A pull off biasing means is used for urging the inner and outer tooth rings axially away from the second one of the gas bearing face surfaces. The rotatable engine member may be a side plate mounted on a rotor disk and the non-rotatable engine member is mounted on a translatable piston axially movably supported on a stationary face seal support structure.

31 Claims, 6 Drawing Sheets

OTHER PUBLICATIONS

"Bissell Disc Springs", Disc Springs, Bellville Page, http://www,amerring,thomasregister.com, 18 pages.

"Face Seal", Smalley Steel Ring Company, Smalley Steel Ring Company—Common Applications for Springs, http://www.smalley.com, 1 page.

"Spring Search Parameters", Smalley Steel Ring Company, Smalley—Spring Search, http://www.ringspring.com, 2 pages.

"Wave Springs", Gardner Spring Inc., Gardner Spring Inc.—Wave Disc Springs, http://www.gardnerspring.com, 1 page.

"Belleville Disc Springs", Gardner Spring Inc., Gardner Spring Inc.—Belleville Disc Spring, http://www.gardner-spring.com, 5 pages.

"Wave Spring Washers", Precision Specialties, Inc., Spring Washers, Wave Washers, Retaining Rings, Grease Fittings, Belleville Washer, . . . , http://www.precspec.com, 3 pages.

* cited by examiner

ASPIRATING FACE SEAL WITH AXIALLY EXTENDING SEAL TEETH

BACKGROUND OF THE INVENTION

The present invention relates generally to aspirating face seals for rotor and stator assemblies and, more particularly, to a rotor and stator assembly with an aspirating face seal having seal teeth.

Aspirating face seals are used to minimize leakage through a gap between two components and from a higher pressure area to a lower pressure area. Such seals have been disclosed for use in rotating machinery, including, but not limited to, turbomachinery such as gas turbine engines used for power generation and for aircraft and marine propulsion. Aspirating face seals are designed to minimize leakage of a fluid such compressed air or combustion gases between a rotor and a stator in gas turbine engines.

Conventional aspirating face seals typically have the rotor configured as oppositely facing first and second seal elements, with the first seal element either being attached to, or being a monolithic portion of, the rotor. Likewise, such seals typically have the stator configured as the second seal element, with the second seal element either being attached to, or being a monolithic portion of, the stator. The first and second seal elements are generally annular, generally perpendicular to the longitudinal axis of the rotor, generally opposing, axially spaced apart, and proximate each other. Typically, the first part and second elements together define a radially extending air bearing and a radially extending air dam positioned radially inward of the air bearing. An air bearing surface of the first element and an air dam surface of the first element generally lie in the same plane. The air bearing surface of the second element has a hole which is an outlet for a first passageway connecting the hole with air from a higher pressure side of the seal. The stator has a second passageway which carries air, which has passed the air dam from the higher pressure side of the seal, to a lower pressure side of the seal. Known seal designs have also included an aspirator tooth extending from the stator axially across, and radially inward of, the air dam, with the aspirator tooth having a tip spaced apart from and proximate the rotor. It is also important to note that aspirating face seal technology uses phrases such as "air bearing", "air dam", and "air flow", wherein it is understood that the word "air" is used to describe the working fluid of the seal. The working fluid of an aspirating face seal can include, without limitation, compressed air, combustion gases, and/or steam.

It is important to note that an aspirating face seal is a non-contacting seal in that the first and second parts of the seal are not suppose to touch but often do for short periods of time during which they experience what are known as rubs. Aspirating face seals generate significant heat and/or scratch rotor surfaces when seal rubs occur. It is, thus, desirable to minimize heat input into the rotating component and maintain a smooth surface flush. Excessive heat input into the rotor component can result in material degradation which in turn can lead to premature component crack initiation. A rough surface finish could result in excessive seal leakage and create a stress riser, which could also cause premature component crack initiation.

BRIEF DESCRIPTION OF THE INVENTION

A gas turbine engine aspirating face seal includes a rotatable engine member and a stationary engine member and a leakage path therebetween. Annular generally planar rotatable and non-rotatable gas bearing face surfaces circumscribed about a centerline are operably associated the rotatable and non-rotatable engine members respectively. Radially inner and outer tooth rings axially extend away from a first one of the rotatable and non-rotatable gas bearing face surfaces across the leakage path and towards a second one of the gas bearing face surfaces. An annular plenum is located between the inner and outer tooth rings along the first one of the rotatable and non-rotatable gas bearing face surfaces. The inner and outer tooth rings have pointed ends proximate to the second one of the rotatable and non-rotatable gas bearing face surfaces. A pull off biasing means is incorporated for urging the inner and outer tooth rings axially away from the second one of the rotatable and non-rotatable gas bearing face surfaces.

In a first exemplary embodiment of the invention, the rotatable engine member is a rotor disk or the rotatable engine member is a side plate mounted the rotor disk and the non-rotatable engine member is mounted on a translatable cylindrical piston which is circumferentially continuous and axially movably supported on a stationary face seal support structure. The seal may incorporate an auxiliary seal disposed across the leakage path radially inwardly of the inner and outer tooth rings. The auxiliary seal includes an annular restrictor tooth radially spaced apart from and proximate to an annular seal land having an annular auxiliary seal surface circumscribed around the engine centerline.

The biasing means is operably disposed between the cylindrical piston and the stationary face seal support structure. The biasing means may include a plurality of circumferentially spaced apart coil springs disposed within circumferentially spaced apart spring chambers formed in part by radially extending static and axially movable flanges attached to the face seal support structure and the translatable cylindrical piston respectively. Alternatively, the biasing means may include a wave spring disposed in a continuous annular spring chamber formed in part by radially extending static and axially movable flanges attached to the face seal support structure and the translatable cylindrical piston respectively.

In a more particular embodiment of the invention, the face seal is incorporated in a turbine engine seal assembly between a relatively high pressure region and a relatively low pressure region at a juncture between the rotatable engine member and the stationary engine member. In a yet more particular embodiment of the invention, the stationary engine member depends from a turbine nozzle and supports an inducer which is operable to direct a portion of high pressure compressor discharge air across the high pressure region.

DETAILED DESCRIPTION OF THE INVENTION

Figure 1:
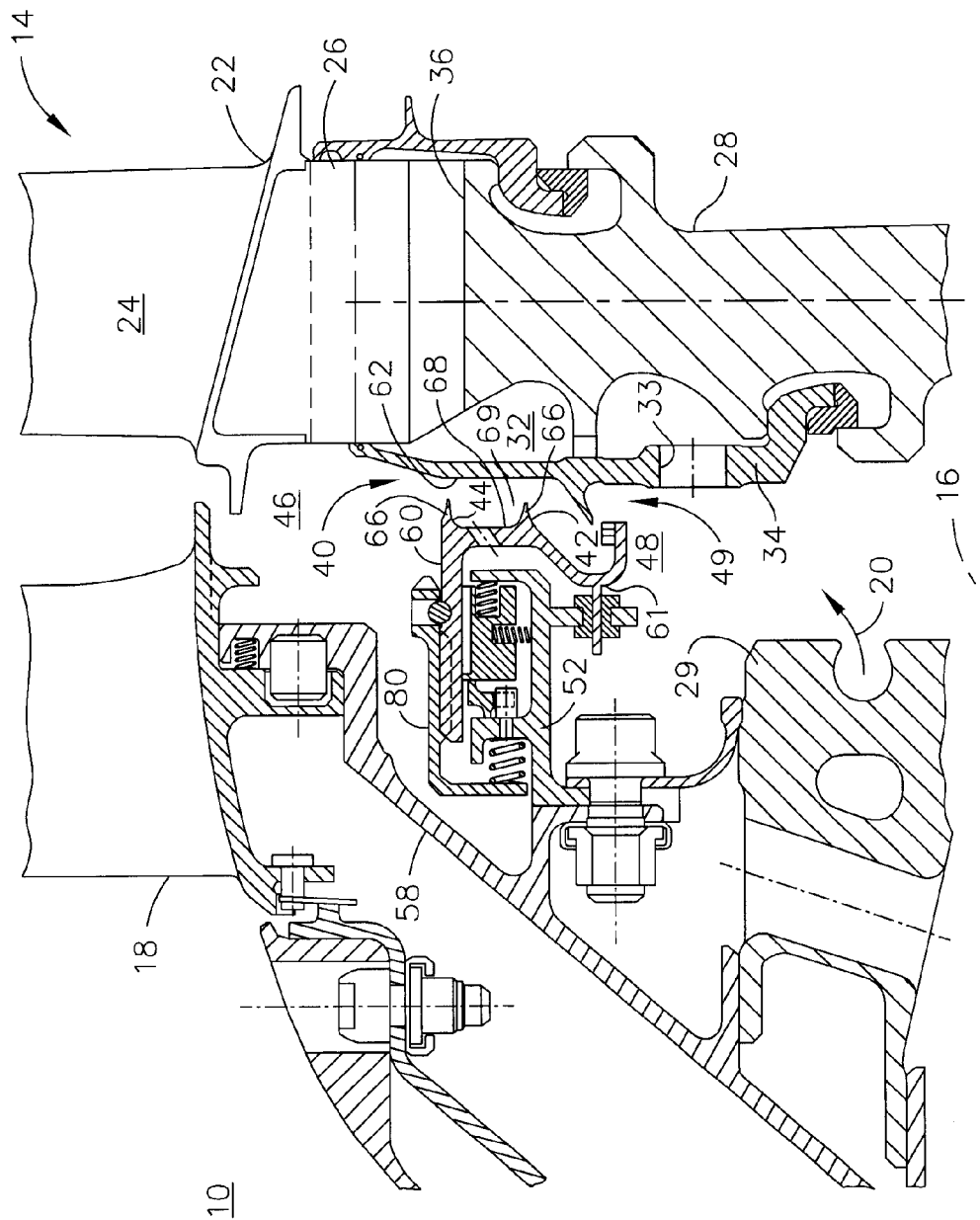
FIG. 1 is a cross-sectional view illustration of a portion of an exemplary gas turbine engine high pressure turbine and a first exemplary embodiment of an aspirating gas bearing face seal with axially extending teeth.

Illustrated in FIG. 1 is a portion of a gas turbine engine including a combustor 10 and a high pressure turbine 14 circumscribed around an engine centerline 16. The high pressure turbine 14 includes a static turbine nozzle 18 and a rotatable turbine stage 22 having coolable turbine blades 24 mounted on a rim 26 of a rotor disk 28 of the turbine stage 22. A portion of high pressure compressor discharge air 20 not burned in a combustor of the engine is directed from a relatively stationary inducer 29 to air cooling passages 32 in the rotatable rotor disk 28 for cooling blades 24. The cooling passages 32 are axially and circumferentially bounded by a side plate 34 which also helps retain the blades 24 in slots 36 in the rim 26 of the rotor disk 28. Compressor discharge air 20 is directed by the inducer 29 across a high pressure region 48 through apertures 33 in the side plate 34 to the air cooling passages 32. An aspirating face seal 40 is used to restrict leakage of the high pressure compressor discharge air 20 from the relatively high pressure region 48 to a relatively low pressure region 46 at the juncture 49 between an rotatable engine member exemplified by the rotor disk 28 and a stationary engine member exemplified by a stationary structure 58. The stationary structure 58 depends from the turbine nozzle 18 and supports the inducer 29. The face seal 40 includes a leakage path 45 between rotatable and non-rotatable engine members and between a rotatable and non-rotatable members of the seal. Non-rotatable is defined as not rotating with the rotor disk 28 or other parts of an engine rotor during engine operation.

Figure 2:
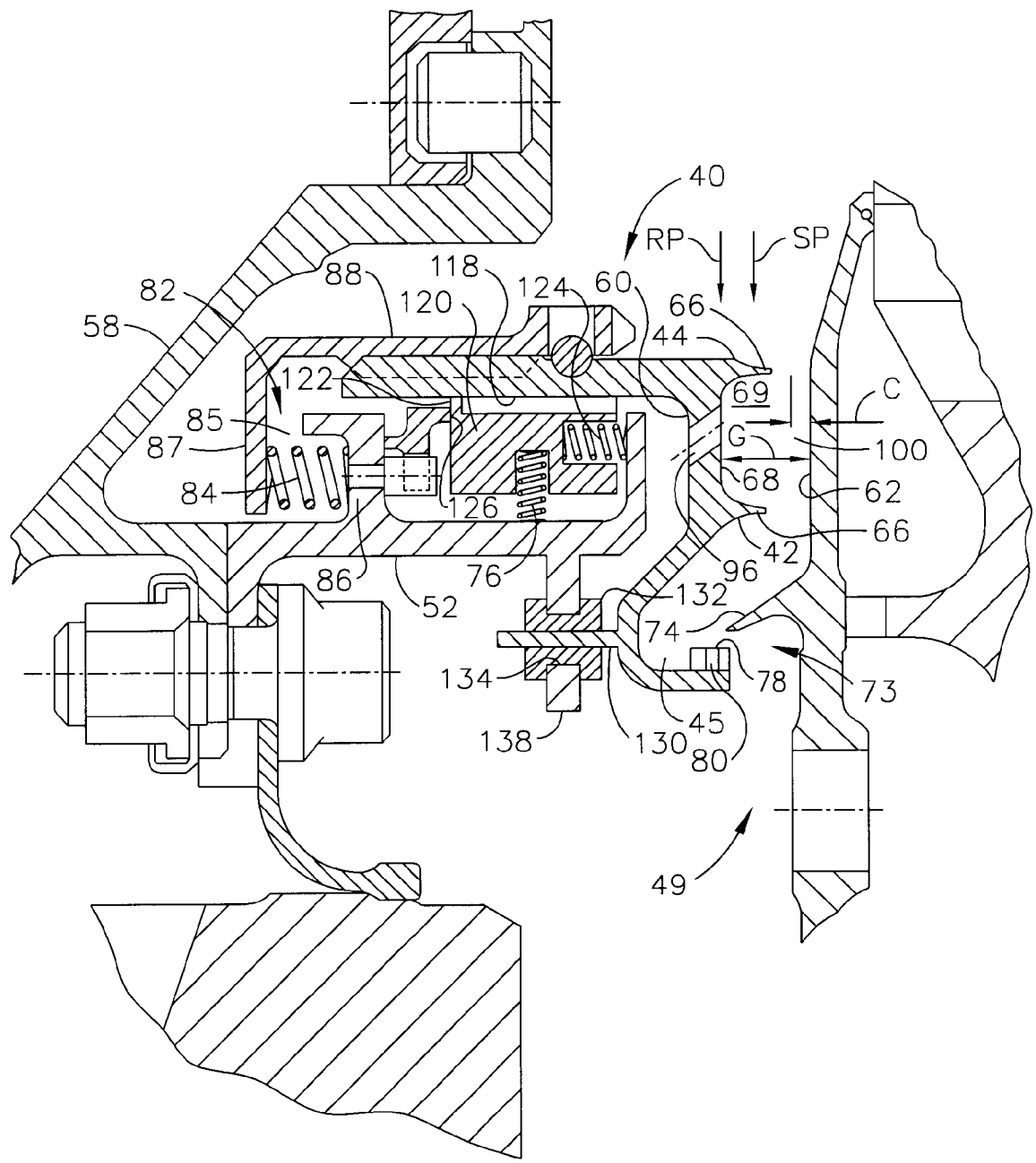
FIG. 2 is an enlarged cross-sectional view illustration of the gas bearing face seal illustrated in FIG. 1.

Illustrated in FIG. 1 and more particularly in FIG. 2 is a first exemplary embodiment of the face seal 40 of the present invention having non-rotatable annular radially inner and outer axially extending tooth rings 42 and 44, respectively. The face seal 40 is designed to restrict leakage of the high pressure compressor discharge air 20 through the leakage path 45 from the relatively high pressure region 48 to the relatively low pressure region 46 at the juncture 49 between the rotatable turbine stage 22 and the stationary structure 58. A face seal ring 60 is mounted on a non-rotatable axially translatable cylindrical piston 88 which is circumferentially continuous and axially movably supported on a stationary face seal support structure 52. The face seal ring 60 exemplifies an axially movable non-rotatable engine member 61 of the present invention. The face seal support structure 52 is fixed with respect to the stationary structure 58. The radially inner and outer axially extending tooth rings 42 and 44 are mounted on the face seal ring 60 and extend radially outward from an axially facing generally planar non-rotatable gas bearing face surface 68 towards an axially facing generally planar rotatable substantially planar gas bearing face surface 62. The face seal ring 60 is supported for axial movement with respect to the rotatable gas bearing face surface 62 which is on the side plate 34 that is mounted to the rotor disk 28. The radially inner and outer tooth rings 42 and 44 provide for low heat input into the rotatable component which is exemplified herein as the side plate 34 and the rotor disk 28 to which it is mounted. The radially inner and outer tooth rings 42 and 44 help maintain a smooth rotor surface finish which is exemplified herein as the rotatable gas bearing face surface 62.

An annular plenum 69 is bounded by the inner and outer tooth rings 42 and 44 and the non-rotatable gas bearing face surface 68 radially extending between the inner and outer tooth rings 42 and 44. The inner and outer tooth rings 42 and 44 extend axially towards the rotatable gas bearing face surface 62 on the side plate 34 and have pointed ends 66 proximate to the rotatable gas bearing face surface 62. A plurality of circumferentially spaced apart vent passages 96 through the face seal ring 60 provide pressure communication between the plenum 69 and low pressure region 46. The vent passages 96 pressurize the plenum 69 with high pressure air from the high pressure region 48 therein during engine operation when there is a substantial pressure differential between high and low pressure regions 48 and 46. An axial gap G is defined between the non-rotatable gas bearing face surface 68 and the rotatable gas bearing face surface 62.

An annular auxiliary seal 73 is also used to restrict airflow across the leakage path 45 and to create sufficient pressure, when the engine is operating, to urge the face seal ring 60 towards the rotatable gas bearing face surface 62. The auxiliary seal 73 includes an annular restrictor tooth 74 extending radially across the leakage path 45 towards an annular seal land 80 having an annular auxiliary seal surface 78. A radial gap H is defined between the annular restrictor tooth 74 and the auxiliary seal surface 78. The restrictor tooth 74 is radially spaced apart from and proximate the annular seal land 80. The annular restrictor tooth 74 and annular seal land 80 are circumscribed around the engine centerline 16. In the exemplary embodiment of the invention illustrated in FIG. 1, the restrictor tooth 74 is attached to the rotatable side plate 34 and the seal land 80 having the auxiliary seal surface 78 is attached to the face seal ring 60.

A pull off biasing means 82 is used for urging the inner and outer tooth rings 42 and 44 axially away from the rotatable gas bearing face surface 62 on the side plate 34 when the engine is not running and/or when the pressures in the high and low pressure regions 48 and 46 are substantially equal. The biasing means 82 illustrated in FIG. 1 is a plurality of circumferentially spaced apart coil springs 84 disposed within circumferentially spaced apart spring chambers 85 formed in part by radially extending static and axially movable flanges 86 and 87 attached to the face seal support structure 52 and the translatable cylindrical piston 88 respectively. Circumferentially spaced apart guide and support pins 130 extend aftwardly from the face seal ring 60 through bushings 132 disposed in pin receiving holes 134 extending through guide and support pin flanges 138 mounted on the face seal support structure 52 forming a guide and support assembly. The guide and support assembly helps to radially support and axially guide the face seal ring 60.

Figure 3:
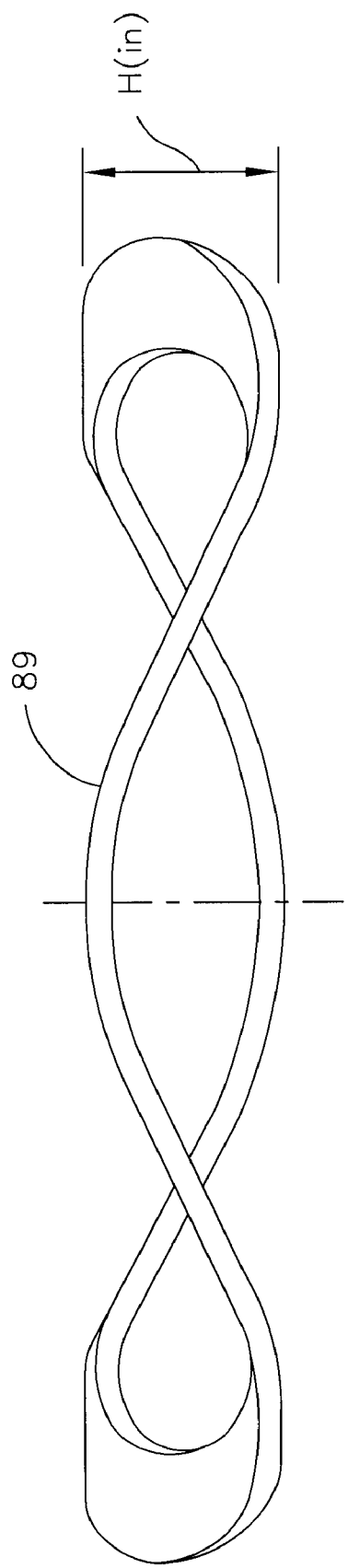
FIG. 3 is a perspective view illustration of a wave spring alternative biasing means.
Figure 5:
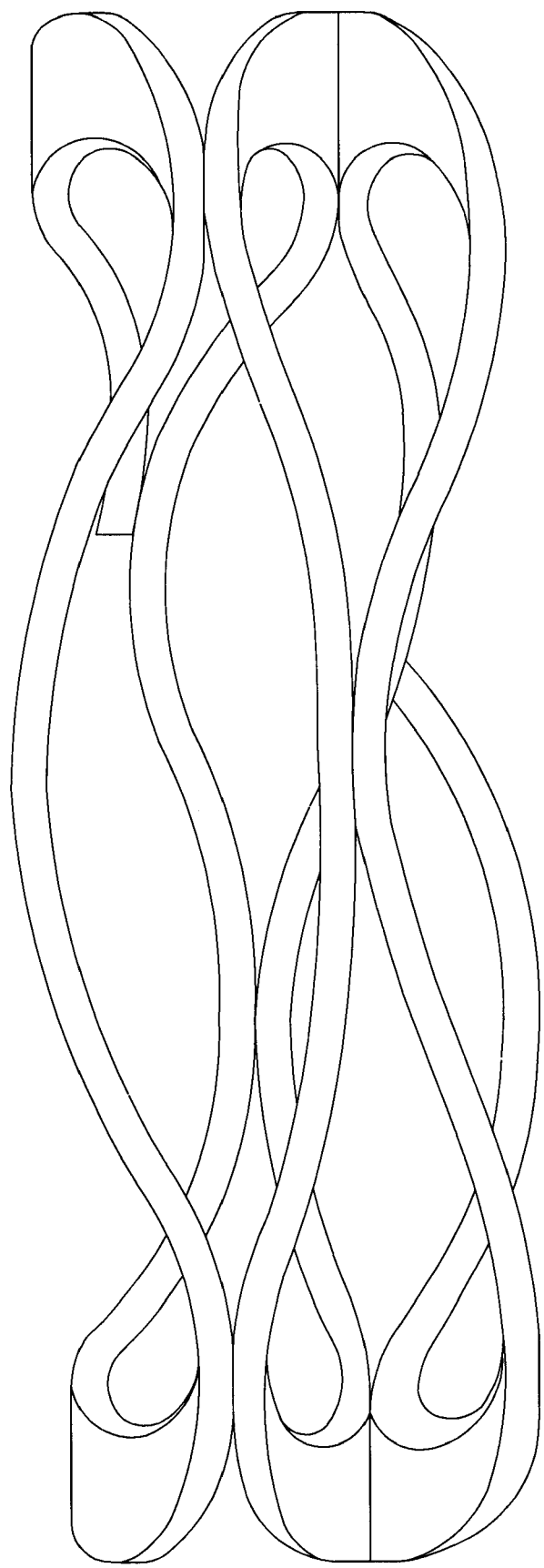
FIG. 5 is a perspective view illustration of a double wrap wave spring alternative biasing means.
Figure 6:
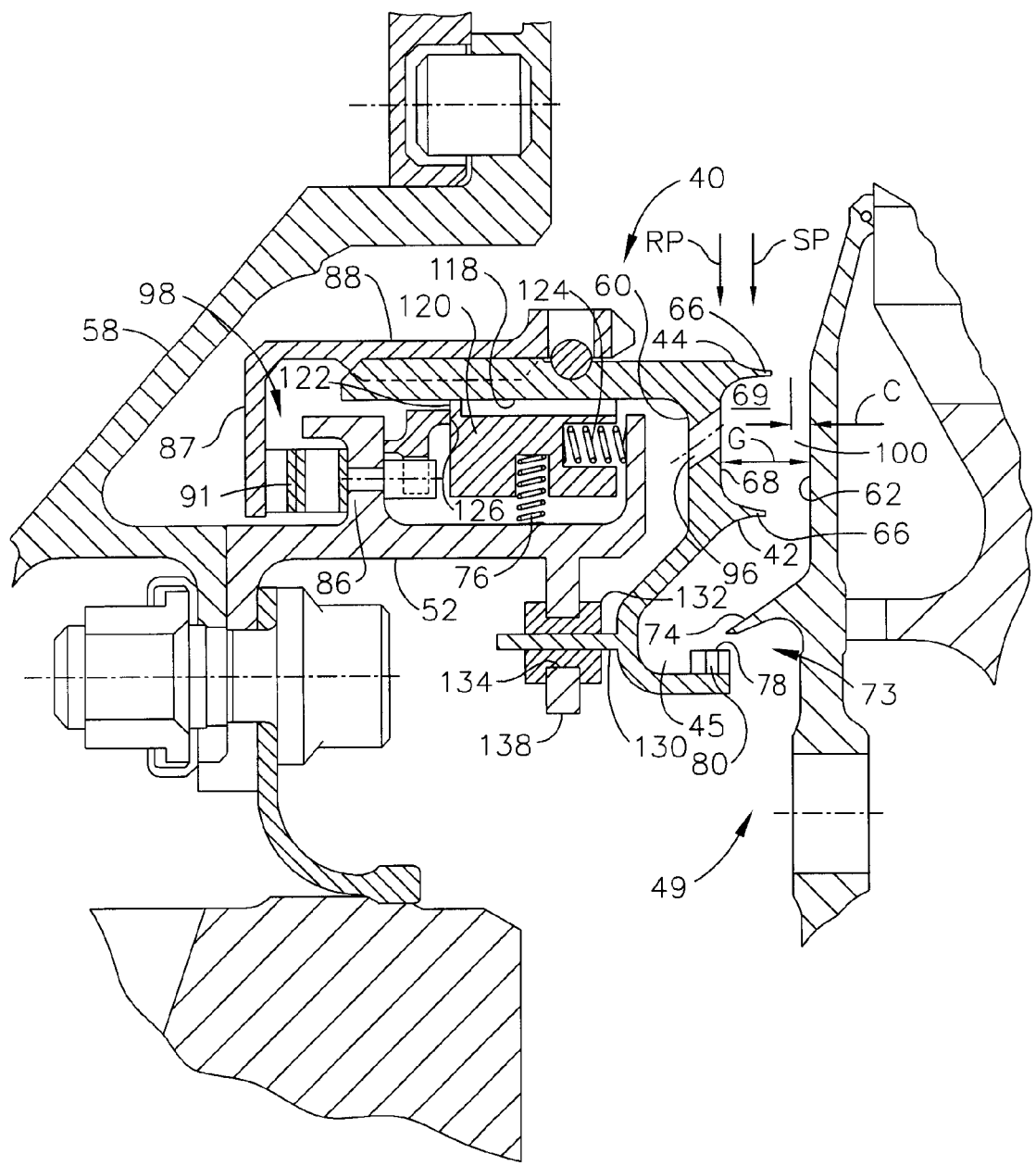
FIG. 6 is a cross-sectional view illustration of a portion of the exemplary gas turbine engine high pressure turbine having the double wrap wave spring illustrated in FIG. 5.

An alternative biasing means 82, illustrated in FIG. 3, is a wave spring 89, also known as a wave spring or a cockle spring which would be disposed in a continuous annular spring chamber 94 (illustrated in FIG. 6) formed in part by the static and axially movable flanges 86 and 87 described above and illustrated in FIG. 1. The wave spring 89 may be a single wrap wave spring as illustrated in FIG. 3 or a multiple wrap wave spring as illustrated by a double wrap wave spring 91 illustrated in FIGS. 5 and 6.

Another alternative biasing means 82, one known to those skilled in the art, is a plurality of circumferentially spaced apart coil springs disposed on the circumferentially spaced apart pins usually mounted on the face seal support structure 52. Because the spring 84 used for urging the inner and outer tooth rings 42 and 44 away from the rotatable gas bearing face surface 62, it is also referred to as a pull off spring.

Figure 4:
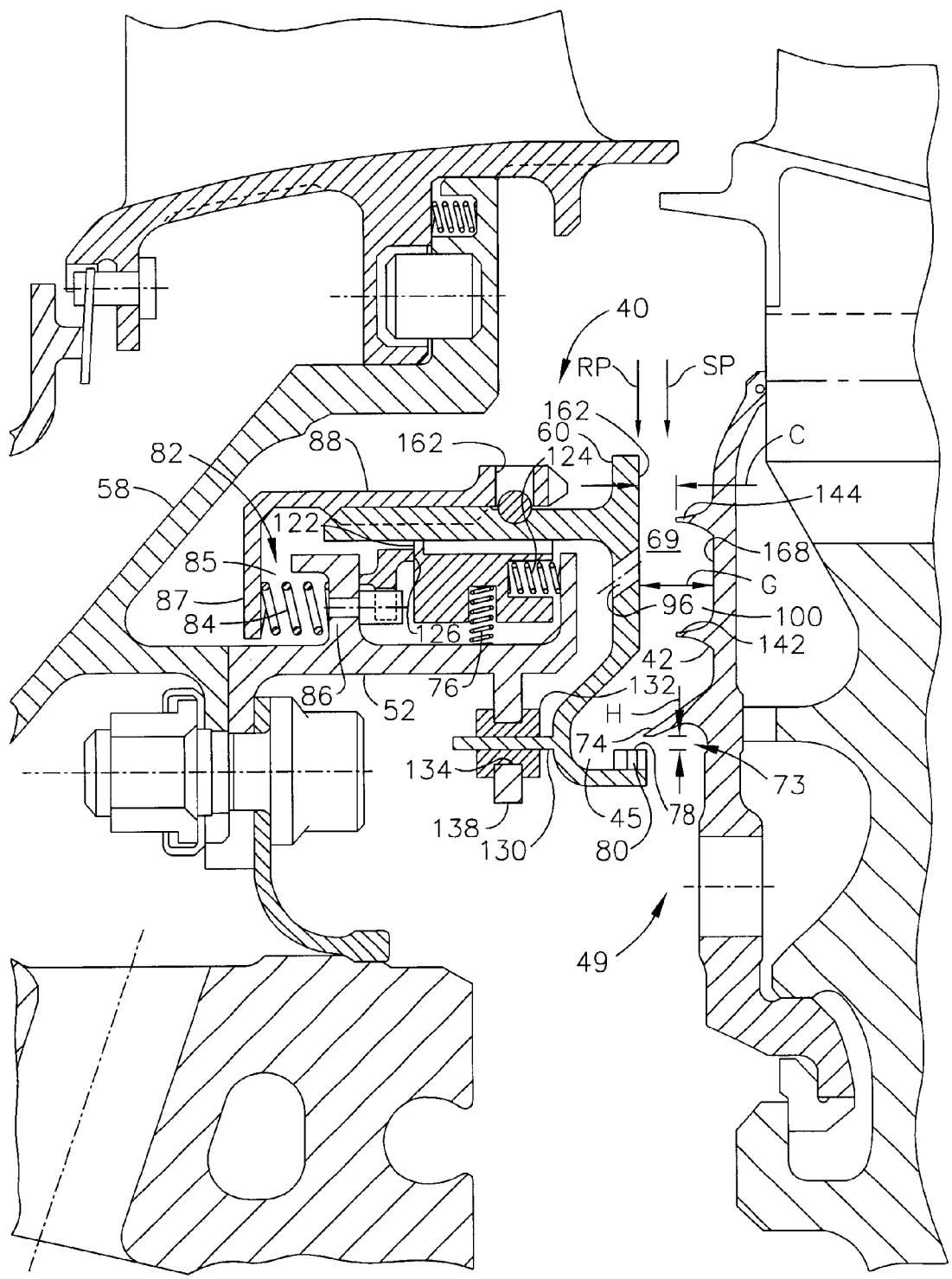
FIG. 4 is a cross-sectional view illustration of a portion of an exemplary gas turbine engine high pressure turbine and a second exemplary embodiment of a gas bearing face seal with rotatable axially extending teeth.

The face seal ring 60 is designed to translate between axial retracted and sealing positions RP and SP respectively as measured at the non-rotatable gas bearing face surface 68, denoted by arrows marked accordingly, as a result of forces acting on the face seal ring 60. The face seal ring 60 is illustrated in its sealing position in FIG. 4. The forces are the result of pressures in the relatively low and high pressure regions 46 and 48 acting on surfaces and spring forces of the biasing or biasing means 82. When the engine is running and the face seal ring 60 is in the sealing position SP and there is an operational clearance C between the pointed ends 66 of the inner and outer tooth rings 42 and 44 and the rotatable gas bearing face surface 62. In one exemplary embodiment of the invention, when the face seal ring 60 in the sealing position SP, the axial gap G is about 25–50 mils (0.025–0.050 inches), the radial gap H is about 75–150 mils (0.075–0.150 inches), and the operational clearance C is about 1–8 mils (0.001–0.008 inches). In such an exemplary embodiment a radius midway between the inner and outer tooth rings 42 and 44 to the engine centerline 16 may be about 10 inches.

The face seals of the present invention avoid significant amounts of heating and scratching of the rotor surfaces when seal rubs occur. Thus, reducing heat input into the rotating components and maintaining a smooth surface finish of the rotating seal surface. This reduces the possibility of material degradation and premature component crack initiation. A coating could be applied to the inner and outer tooth rings 42 and 44, also referred to as rotor axial seal teeth, to further minimize heat input into the rotor part, exemplified herein as the side plate 34 and the rotor disk 28 to which it is mounted. Another coating could be applied to the static part to minims heat generation and protect the parent material of the static part from scratches.

During low or no power conditions the face seal ring 60 and the inner and outer tooth rings 42 and 44 are biased away from the rotatable gas bearing face surface 62 by the biasing means 82. During higher power operation, the restrictor tooth 74 restricts the discharge air 20 flowing from the relatively high pressure region 48 to the relatively low pressure region 46 thereby causing a pressure differential between high and low pressure regions 48 and 46. The pressure differential between high and low pressure regions 48 and 46 acts on the face seal ring 60 and urges the face seal ring 60 and the inner and outer tooth rings 42 and 44 and tooth toward the rotatable gas bearing face surface 62.

A portion of the high pressure discharge air 20 is supplied to a gas bearing space 100, which includes the annular plenum 69, between the face seal ring 60 and the rotatable gas bearing face surface 62 through the vent passages 96 in the face sealing ring to establish a predetermined gas bearing face clearance. Pressure forces developed in the gas bearing space 100 oppose further motion of the face seal ring 60 and the inner and outer tooth rings 42 and 44 toward the rotatable gas bearing face surface 62. Accelerations and other motion of the face seal ring 60 and the inner and outer tooth rings 42 and 44 towards the rotatable gas bearing face surface 62 increases the pressure forces in the gas bearing space 100, thereby urging the face seal ring away from the rotatable gas bearing face surface to maintain the predetermined clearance.

As the engine is started, the compressor discharge pressure rises and the pressure in the high pressure region 48 begins to rise because the restrictor tooth 74 restricts the discharge air 20 flowing from the relatively high pressure region 48 to the relatively low pressure region 46. The pressure differential between the low and high pressure regions 46 and 48 results in a closing pressure force acting on face seal ring 60. The pressure force acts against a spring force from the biasing means 82 to urge face seal ring 60 and the inner and outer tooth rings 42 and 44 toward the rotatable gas bearing face surface 62.

As face seal ring 60 reaches the sealing position SP, the axial gap G becomes much smaller than the radial gap H, the pressure drop across the restrictor tooth 74 is insubstantial and airflow caused by the pressure drop between the low and high pressure regions 46 and 48 occurs substantially across gap between the face seal ring 60 and the inner and outer tooth rings 42 and 44 and the rotatable gas bearing face surface 62. Thus, gas bearing forces are developed at the non-rotatable gas bearing face surface 68 and the rotatable gas bearing face surface 62 which, acting with the spring force, balance the closing force and maintain the operational clearance C between the pointed ends 66 of the inner and outer tooth rings 42 and 44 and the rotatable gas bearing face surface 62 at a predetermined size.

A secondary seal means, such as a circumferentially extending split piston ring secondary seal 120, is provided to allow the face seal ring 60 to translate axially in response to the motions of the rotating surface on the rotor. The piston ring secondary seal 120 is urged radially inwardly by spring means, such as second coil springs 76, against a radially inwardly facing annular inner surface 118 of the face seal ring 60. A circumferentially extending secondary seal dam 122 on the piston ring secondary seal 120 is urged into radial sealing engagement with the inner surface 118. The piston ring secondary seal 120 is urged axially by a third spring means, such as by a plurality of circumferentially spaced third coil springs 124, into engagement with an axially facing substantially planar sealing surface 126 on the face seal support structure 52.

Illustrated in FIG. 3 is a second exemplary embodiment of the face seal 40 of the present invention having axially extending annular radially inner and outer rotatable tooth rings 142 and 144 mounted on the side plate 34 which is attached to the rotatable turbine stage 22. The rotatable tooth rings 142 and 144 are engagable with a substantially planar non-rotatable gas bearing face surface 168. The face seal ring 60 includes the non-rotatable gas bearing face surface 168 and is mounted on the translatable cylindrical piston 88 which is axially movably supported on the stationary face seal support structure 52. The inner and outer rotatable tooth rings 142 and 144 extend axially from the rotatable gas bearing face surface 162 towards and have teeth which are proximate the non-rotatable gas bearing face surface 168. The face seal ring 60 containing the non-rotatable gas bearing face surface 168 is supported for axial movement with respect to the inner and outer rotatable tooth rings 142 and 144 on the side plate 34 which is attached to the rotor disk 28. The annular restrictor tooth 74 is attached to the face seal ring 60 and the auxiliary seal surface 78 and the seal land 80 are attached to the rotatable side plate 34.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:
1. A gas turbine engine aspirating face seal comprising:
   a rotatable engine member and a non-rotatable engine member and a leakage path therebetween, an annular generally planar non-rotatable gas bearing face surface circumscribed about a centerline and operably associated with said non-rotatable engine member, an annular generally planar rotatable gas bearing face surface circumscribed about said centerline and operably associated with said rotatable engine member, radially inner and outer tooth rings axially extending away from one of said gas bearing face surfaces across said leakage path and towards a second one of said gas bearing face surfaces, an annular plenum located between said inner and outer tooth rings and a portion of said gas bearing face surface between said inner and outer tooth rings, said inner and outer tooth rings having pointed ends proximate to said second one of said gas bearing face surfaces, and a biasing means for urging said inner and outer tooth rings axially away from said second one of said gas bearing face surfaces.

2. A seal as claimed in claim 1 wherein said rotatable engine member is a rotor disk.

3. A seal as claimed in claim 1 wherein said rotatable engine member is a side plate mounted on a rotor disk and said non-rotatable engine member is mounted on a translatable cylindrical piston which is circumferentially continuous and axially movably supported on a stationary face seal support structure.

4. A seal as claimed in claim 3 wherein said biasing means is operably disposed between said cylindrical piston and said stationary face seal support structure.

5. A seal as claimed in claim 4 wherein said biasing means includes a plurality of circumferentially spaced apart coil springs disposed within circumferentially spaced apart spring chambers formed in part by radially extending static and axially movable flanges attached to said face seal support structure and said translatable cylindrical piston respectively.

6. A seal as claimed in claim 4 wherein said biasing means includes a wave spring disposed in a continuous annular spring chamber formed in part by radially extending static and axially movable flanges attached to said face seal support structure and said translatable cylindrical piston respectively.

7. A seal as claimed in claim 4 further comprising an auxiliary seal having a restrictor tooth radially spaced apart from and proximate to with a seal land disposed between said rotatable engine member non-rotatable engine member.

8. A seal as claimed in claim 4 further comprising an auxiliary seal disposed across said leakage path radially inwardly of said inner and outer tooth rings, said auxiliary seal comprising an annular restrictor tooth radially spaced apart from and proximate to an annular seal land having an annular auxiliary seal surface circumscribed around said engine centerline.

9. A seal as claimed in claim 8 wherein said rotatable engine member is a side plate mounted on a rotor disk and said non-rotatable engine member is mounted on a translatable cylindrical piston which is circumferentially continuous and axially movably supported on a stationary face seal support structure.

10. A seal as claimed in claim 1 further comprising an auxiliary seal having a restrictor tooth radially spaced apart from and proximate to a seal land disposed between said rotatable engine member and non-rotatable engine member.

11. A seal as claimed in claim 10 wherein said rotatable engine member is a rotor disk.

12. A seal as claimed in claim 10 wherein said rotatable engine member is a side plate mounted on a rotor disk and said non-rotatable engine member is mounted on a translatable cylindrical piston which is circumferentially continuous and axially movably supported on a stationary face seal support structure.

13. A seal as claimed in claim 12 further comprising an auxiliary seal disposed across said leakage path radially inwardly of said inner and outer tooth rings, said auxiliary seal comprising an annular restrictor tooth radially spaced apart from and proximate to an annular seal land having an annular auxiliary seal surface circumscribed around said engine centerline.

14. A seal as claimed in claim 1 further comprising an auxiliary seal disposed across said leakage path radially inwardly of said inner and outer tooth rings, said auxiliary seal comprising an annular restrictor tooth radially spaced apart from and proximate to an annular seal land having an annular auxiliary seal surface circumscribed around said engine centerline.

15. A gas turbine engine seal assembly comprising:

an aspirating face seal disposed between a relatively high pressure region and a relatively low pressure region at a juncture between a rotatable engine member and a stationary engine member, an annular generally planar non-rotatable gas bearing face surface circumscribed about a centerline and operably associated with said non-rotatable engine member, an annular generally planar rotatable gas bearing face surface circumscribed about said centerline and operably associated with said rotatable engine member, a leakage path in part axially extending between said gas bearing face surfaces, radially inner and outer tooth rings axially extending away from a first one of said gas bearing face surfaces across a portion of said leakage path and towards a second one of said gas bearing face surfaces, an annular plenum located between said inner and outer tooth rings and said first one of said gas bearing face surfaces, said inner and outer tooth rings having pointed ends proximate to said second one of said gas bearing face surfaces, and a biasing means for urging said inner and outer tooth rings axially away from said second one of said gas bearing face surfaces.

16. An assembly as claimed in claim 15 further comprising an auxiliary seal disposed across said leakage path radially inwardly of said inner and outer tooth rings, said auxiliary seal comprising an annular restrictor tooth radially spaced apart from and proximate to an annular seal land having an annular auxiliary seal surface circumscribed around said engine centerline.

17. An assembly as claimed in claim 15 wherein said rotatable engine member is a side plate mounted on a rotor disk and said non-rotatable engine member is a face seal ring mounted on a translatable cylindrical piston which is circumferentially continuous and axially movably supported on a stationary face seal support structure.

18. An assembly as claimed in claim 17 further comprising an auxiliary seal disposed across said leakage path radially inwardly of said inner and outer tooth rings, said auxiliary seal comprising an annular restrictor tooth radially spaced apart from and proximate to an annular seal land having an annular auxiliary seal surface circumscribed around said engine centerline.

19. An assembly as claimed in claim 18 wherein said annular restrictor tooth is attached to said side plate and said annular seal land is attached to said face seal ring.

20. An assembly as claimed in claim 19 wherein said biasing means operably disposed between said cylindrical piston and said stationary face seal support structure.

21. An assembly as claimed in claim 20 wherein said biasing means includes a plurality of circumferentially spaced apart coil springs disposed within circumferentially spaced apart spring chambers formed in part by radially extending static and axially movable flanges attached to said face seal support structure and said translatable cylindrical piston respectively.

22. An assembly as claimed in claim 20 wherein said biasing means includes a wave spring disposed in a continuous annular spring chamber formed in part by radially extending static and axially movable flanges attached to said face seal support structure and said translatable cylindrical piston respectively.

23. An assembly as claimed in claim 20 wherein said said face seal ring has said radially inner and outer tooth rings extending axially away from said non-rotatable gas bearing face surface.

24. An assembly as claimed in claim 20 wherein said rotatable engine member has said radially inner and outer tooth rings extending axially away from said rotatable gas bearing face surface.

25. A gas turbine engine seal assembly comprising:

an aspirating face seal disposed between a relatively high pressure region and a relatively low pressure region at a juncture between a rotatable engine member and a stationary engine member, said stationary structure depending from a turbine nozzle and supporting an inducer which is operable to direct a portion of high pressure compressor discharge air across said high pressure region, an annular generally planar non-rotatable gas bearing face surface circumscribed about a centerline and operably associated with said non-rotatable engine member, an annular generally planar rotatable gas bearing face surface circumscribed about said centerline and operably associated with said rotatable engine member, a leakage path in part axially extending between said gas bearing face surfaces, radially inner and outer tooth rings axially extending away from a first one of said gas bearing face surfaces across a portion of said leakage path and towards a second one of said gas bearing face surfaces, an annular plenum located between said inner and outer tooth rings and said first one of said gas bearing face surfaces, said inner and outer tooth rings having pointed ends proximate to said second one of said gas bearing face surfaces, and a biasing means for urging said inner and outer tooth rings axially away from said second one of said gas bearing face surfaces.

26. An assembly as claimed in claim 25 wherein said rotatable engine member is a side plate mounted on a rotor disk and said non-rotatable engine member is a face seal ring mounted on a translatable cylindrical piston which is circumferentially continuous and axially movably supported on a stationary face seal support structure.

27. An assembly as claimed in claim 26 further comprising an auxiliary seal disposed across said leakage path radially inwardly of said inner and outer tooth rings, said auxiliary seal comprising an annular restrictor tooth radially spaced apart from and proximate to an annular seal land having an annular auxiliary seal surface circumscribed around said engine centerline.

28. An assembly as claimed in claim 27 wherein said annular restrictor tooth is attached to said side plate and said annular seal land is attached to said face seal ring.

29. An assembly as claimed in claim 28 wherein said biasing means operably disposed between said cylindrical piston and said stationary face seal support structure.

30. An assembly as claimed in claim 28 wherein said biasing means includes a plurality of circumferentially spaced apart coil springs disposed within circumferentially spaced apart spring chambers formed in part by radially extending static and axially movable flanges attached to said face seal support structure and said translatable cylindrical piston respectively.

31. An assembly as claimed in claim 28 wherein said biasing means includes a wave spring disposed in a continuous annular spring chamber formed in part by radially extending static and axially movable flanges attached to said face seal support structure and said translatable cylindrical piston respectively.

* * * * *